(12) United States Patent
Sorvisto et al.

(10) Patent No.: US 9,110,536 B2
(45) Date of Patent: Aug. 18, 2015

(54) APPARATUS AND A METHOD FOR PROVIDING HAPTIC FEEDBACK

(75) Inventors: Esa Lauri Sorvisto, Oulu (FI); Jouko Antero Sormunen, Kiviniemi (FI)

(73) Assignee: Nokia Technologies Oy, Espoo (FI)

( * ) Notice: Subject to any disclaimer, the term of this patent is extended or adjusted under 35 U.S.C. 154(b) by 339 days.

(21) Appl. No.: 13/808,373

(22) PCT Filed: Jul. 5, 2010

(86) PCT No.: PCT/IB2010/053077
§ 371 (c)(1),
(2), (4) Date: Feb. 5, 2013

(87) PCT Pub. No.: WO2012/004629
PCT Pub. Date: Jan. 12, 2012

(65) Prior Publication Data
US 2013/0127767 A1   May 23, 2013

(51) Int. Cl.
*G06F 3/041* (2006.01)
*G06F 3/0488* (2013.01)
*G06F 3/01* (2006.01)

(52) U.S. Cl.
CPC .............. *G06F 3/0416* (2013.01); *G06F 3/016* (2013.01); *G06F 3/0488* (2013.01)

(58) Field of Classification Search
CPC ...... G06F 3/016; G06F 1/1626; G06F 3/0416

USPC ............ 340/407.1–407.2; 345/156, 169, 173; 715/701–702
See application file for complete search history.

(56) References Cited

U.S. PATENT DOCUMENTS

| | | | |
|---|---|---|---|
| 5,488,351 A | 1/1996 | Hedayatnia et al. | 340/407.1 |
| 2007/0040815 A1* | 2/2007 | Rosenberg et al. | 345/173 |
| 2008/0117166 A1 | 5/2008 | Rosenberg | 345/156 |
| 2009/0243997 A1* | 10/2009 | Tierling et al. | 345/156 |
| 2010/0090814 A1 | 4/2010 | Cybart et al. | 340/407.2 |
| 2010/0127601 A1 | 5/2010 | Pettersson | 310/331 |
| 2010/0149111 A1* | 6/2010 | Olien | 345/173 |
| 2010/0156818 A1* | 6/2010 | Burrough et al. | 345/173 |
| 2010/0156824 A1* | 6/2010 | Paleczny et al. | 345/173 |
| 2010/0328230 A1* | 12/2010 | Faubert et al. | 345/173 |
| 2011/0193824 A1* | 8/2011 | Modarres et al. | 345/177 |
| 2011/0276878 A1* | 11/2011 | Sormunen | 715/702 |

FOREIGN PATENT DOCUMENTS

WO   WO 2011/008292 A1   1/2011

* cited by examiner

*Primary Examiner* — Hong Zhou
(74) *Attorney, Agent, or Firm* — Harrington & Smith

(57) ABSTRACT

An apparatus including a display module; an actuator connected to the display, the actuator being configured to apply a first force in a first direction to the display module; and at least one counterweight connected to the actuator, the actuator being configured to apply a second force in a second direction to the counterweight, wherein the apparatus experiences substantially no translational moment.

16 Claims, 6 Drawing Sheets

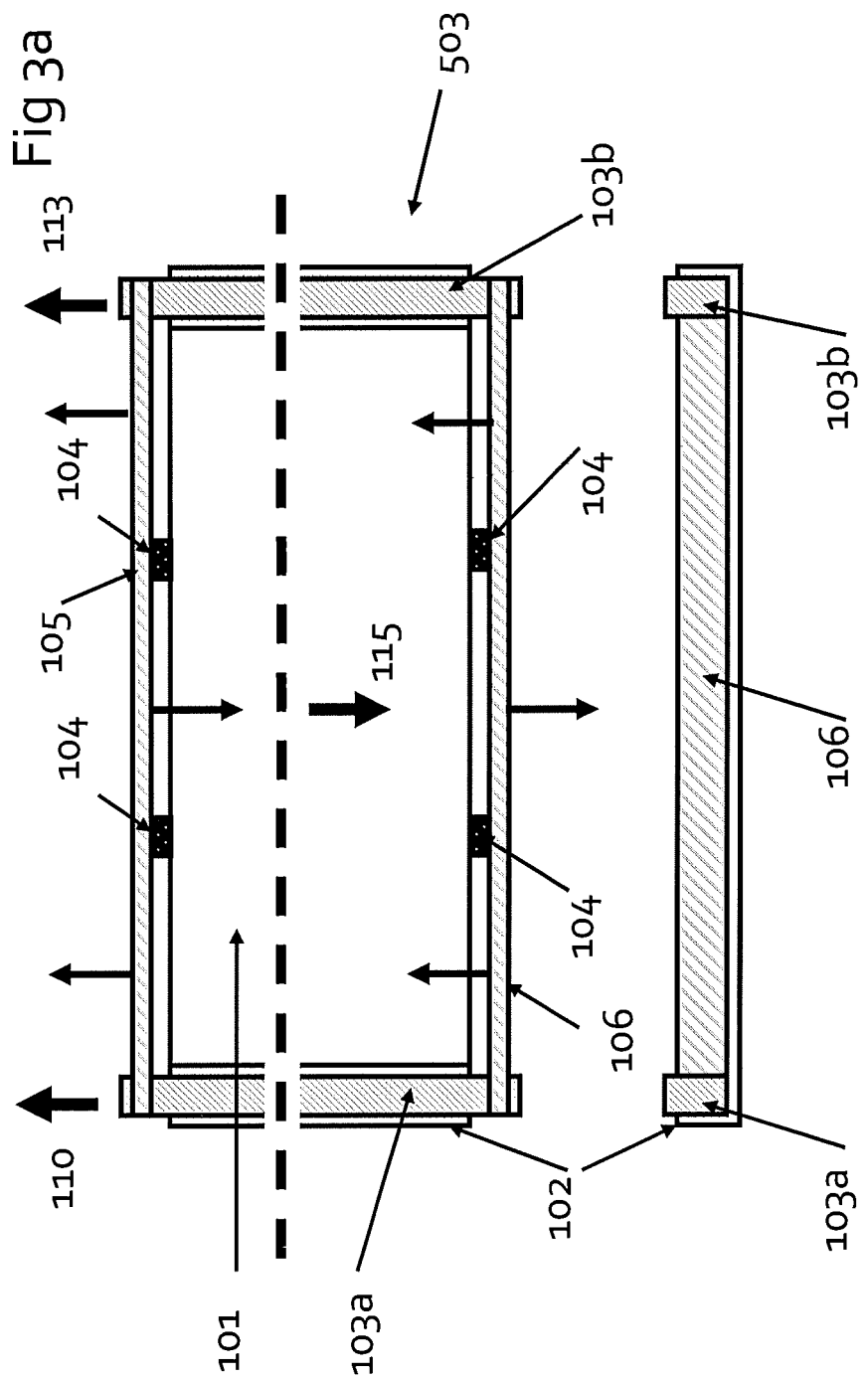

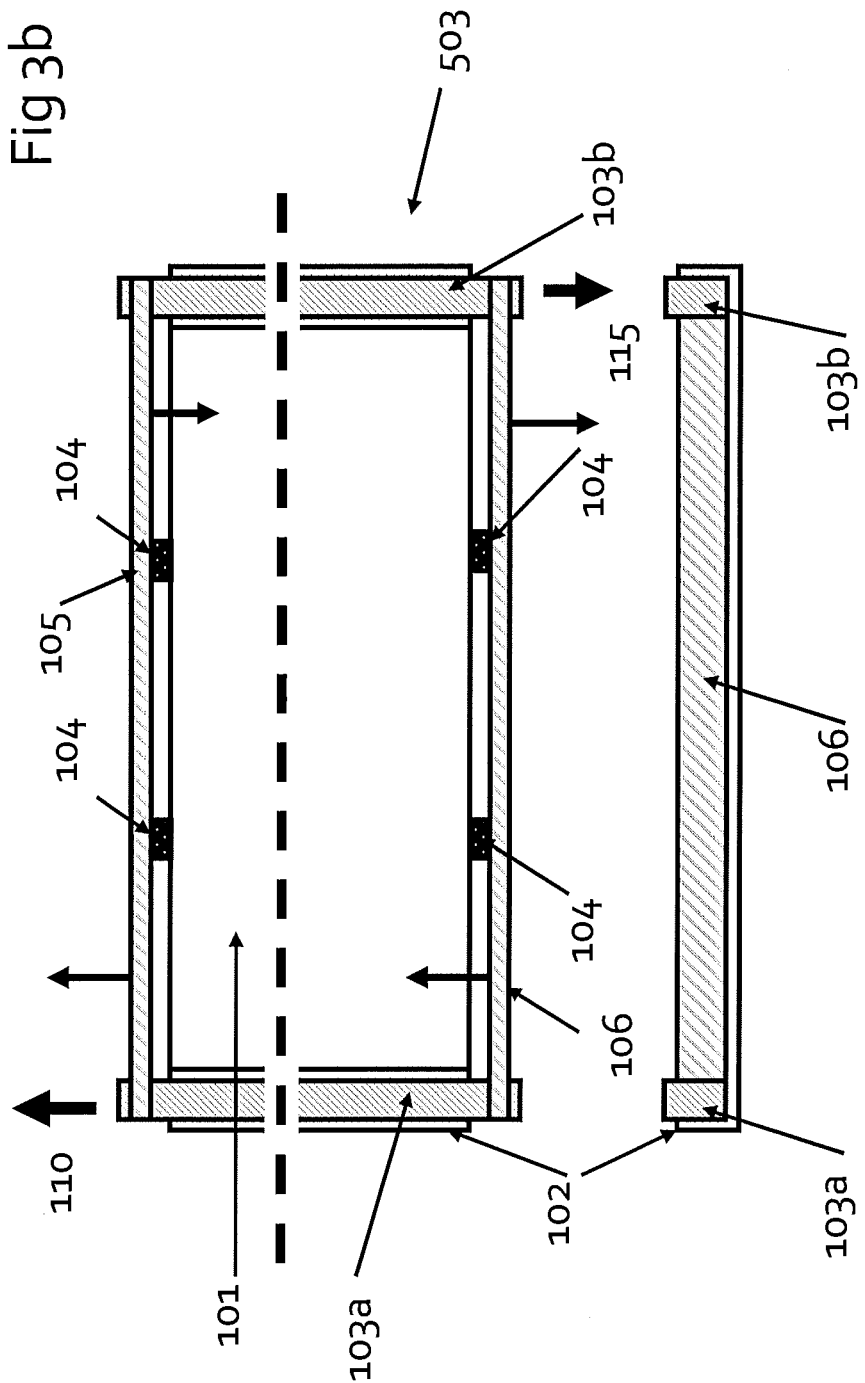

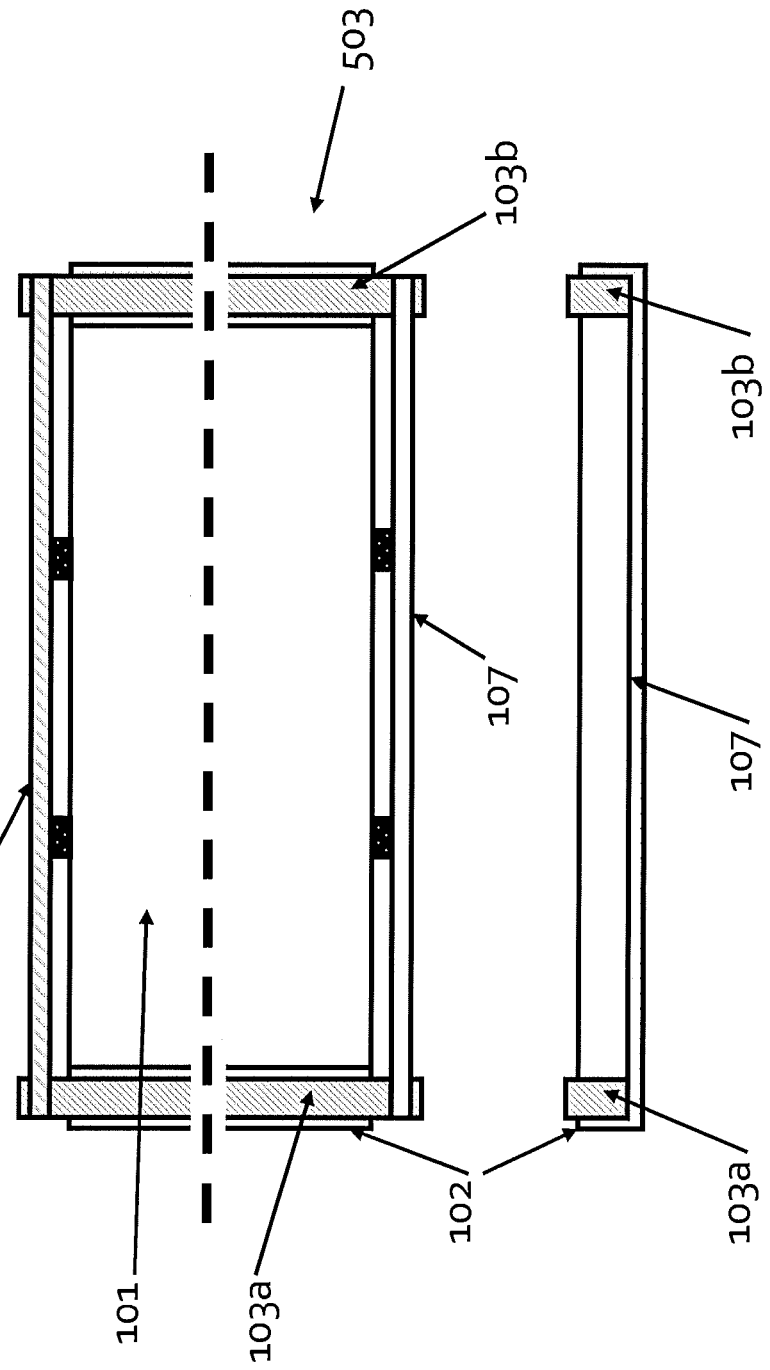

APPARATUS AND A METHOD FOR PROVIDING HAPTIC FEEDBACK

The present invention relates to an apparatus providing haptic feedback. The invention further relates to, but is not limited to, an apparatus providing haptic feedback for use in mobile devices.

Many portable devices, for example mobile telephones are equipped with a display such as a glass or plastic display window for providing information to the user. Furthermore such display windows are now commonly used as touch sensitive inputs. The use of a touch sensitive input with the display has the advantage over a mechanical keypad in that the display may be configured to show a range of different inputs depending on the mode of operating the device. For example, in a first mode of operation the display may be enabled to enter a phone number by displaying a simple numeric keypad arrangement and in a second mode the display may be enabled for text input by displaying an alphanumeric display configuration such as a simulated Qwerty keyboard display arrangement.

However such touchscreen inputs have a disadvantage with respect to mechanical keys in that the user does not experience the usual expected click or mechanical switch feedback to indicate that an input has been detected.

To attempt to overcome this some equipment has been provided with a mechanical or audible simulation of a key press.

This feedback is known as haptic feedback when felt. Some touch screen devices have been equipped with device haptic feedback, in other words an ordinary vibration such as produced by the speaker within the device is used to make the whole device shake (and also provide an audio cue of the key press) as the user touches the screen and is detected. In other devices an eccentric mass is used to vibrate the devices when the device detects that a user has touched the screen. These device-haptic devices however are themselves problematic as they produce feedback which can easily become annoying and is often switched off. Device feedback furthermore can lead to loss of accuracy of input as the whole device is vibrated and the handheld device has to be held firmly to be secured.

A second type of haptic feedback is a user interface (UI) haptic feedback (which may also be known as localized haptic feedback). The user interface (or UI) haptic device employs a user interface surface, for example the window above the display and the touch sensor which is able to be move against the user's finger. Furthermore the user interface in the form of the window is able to apply a force which the user senses as the mechanical resistance generated by the button or keypad click. Typically such systems are equipped with an actuator to generate the force which is applied and which the user senses as a button click.

However even in the second type of haptic feedback the mass ratio between the display and the mechanics of the device, for example the casing mass, is typically small. Vibration experienced by the display moving against the user's finger can as explained by Newton's laws of motion affect the case and therefore be felt upon the holding hand or upon the surface the device is operating on. It has been proposed that this case/device vibration issue could be solved by separating the touch surface from the display (and rest of device) however this separation can cause optical clarity issues together with an associated thickness penalty for the device in question. A further proposed solution to the case vibration issue is to dampen the vibration felt upon the case by adding extra mass to the chassis or casing. However the mass required would significantly increase the mass of the device rendering portable devices unacceptably heavy when compared against non-haptic feedback devices.

This application proceeds from the consideration that the provision of moving a mass in the opposite direction to that affecting the touch surface display is capable of compensating for the display moment.

It is an aim of at least some embodiments of the invention to address one or more of these problems.

According to an aspect of the invention, there is provided an apparatus comprising: a display module; an actuator connected to the display, the actuator being configured to apply a first force in a first direction to the display module; and at least one counterweight connected to the actuator, the actuator being configured to apply a second force in a second direction to the counterweight, wherein the apparatus experiences substantially no translational moment.

The actuator may comprise a first piezo-electric actuator connected at substantially a first end to a first counterweight, substantially at a second end to a second counterweight, and at least one further point to the display module.

The actuator may comprise a second piezoelectric actuator connected at substantially a second end to the first counterweight, at substantially a second end to the second counterweight and at least one further point to the display module on an opposite side to the display module to the side of the display module connected to the first piezo-electric actuator.

The apparatus may further comprise a resilient member connected at substantially a second end to the first counterweight, at substantially a second end to the second counterweight and at least one further point to the display module on an opposite side to the display module to the side of the display module connected to the first piezo-electric actuator.

The apparatus may further comprise a chassis member, wherein the display module and the at least one counterweight may be mounted in a floating configuration on the chassis member.

The display module may be connected to the chassis by at least one of: at least one spring; at least one vertical metal arm; at least one foam body; at least one bearing; at least one trail; and at least one low friction sliding surface.

The actuator may be at least one of: a piezo-actuator; a dynamic eccentric mass actuator; a moving coil actuator; and a moving magnet actuator.

The display module may be a touch sensitive display module, wherein the actuator may be configured to apply the first and the second force in response to the display module determines a contact on the touch sensitive display module.

The apparatus may further comprise at least one spacer located between the actuator and the display module, wherein the actuator may be configured to apply a first force in a first direction to the display module via the at least one spacer.

The apparatus may further comprise at least one further counterweight connected to the actuator, the actuator may be configured to apply a third force in the second direction to the first counterweight, wherein the apparatus experiences a rotational moment.

According to a second aspect of the invention there is provided a method of operating an apparatus comprising: applying by an actuator a first force in a first direction to a display module; and applying by the actuator a second force in a second direction to at least one counterweight, wherein the apparatus experiences substantially no translational moment.

Applying a second force in a second direction to at least one counterweight may comprise connecting the actuator at substantially a first end to a first counterweight, substantially at a second end to a second counterweight, and at least one further point to the display module.

Applying a second force in a second direction to at least one counterweight may further comprise connecting a further actuator at substantially a second end to the first counterweight, at substantially a second end to the second counterweight and at least one further point to the display module on an opposite side to the display module to the side of the display module connected to the actuator.

Applying a second force in a second direction to at least one counterweight may further comprise connecting a resilient member at substantially a second end to the first counterweight, at substantially a second end to the second counterweight and at least one further point to the display module on an opposite side to the display module to the side of the display module connected to the actuator.

The method may further comprise mounting the display module and the at least one counterweight in a floating configuration over a chassis member.

The method may further comprise connecting the display module to the chassis by at least one of: at least one spring; at least one vertical metal arm; at least one foam body; at least one bearing; at least one trail; and at least one low friction sliding surface.

The actuator may be at least one of: a piezo-actuator; a dynamic eccentric mass actuator; a moving coil actuator; and a moving magnet actuator.

The display module may be a touch sensitive display module, wherein the method may further comprise determining a contact on the touch sensitive display module; and wherein the actuator may be configured to apply the first and the second force in response the contact on the display module.

The method may further comprise connecting the actuator and the display module by at least one spacer, wherein the actuator may be configured to apply a first force in a first direction to the display module via the at least one spacer.

The method may further comprise connecting at least one further counterweight to the actuator, and applying a third force in the second direction to the first counterweight, such that the apparatus experiences a rotational moment.

According to a third aspect of the invention, there is provided an apparatus comprising: display means; actuator means connected to the display means, the actuator means for applying a first force in a first direction to the display means; and at least one force opposing means connected to the actuator means, the actuator means being configured to apply a second force in a second direction to the force opposing means, wherein the apparatus experiences substantially no translational moment.

The actuator means may comprise a first piezo-electric actuator connected at substantially a first end to a first force opposing means, substantially at a second end to a second force opposing means, and at least one further point to the display means.

The actuator means may comprise a second piezo-electric actuator connected at substantially a second end to the first force opposing means, at substantially a second end to the second force opposing means and at least one further point to the display means on an opposite side to the display means to the side of the display means connected to the first piezo-electric actuator.

The apparatus may further comprise a resilient member connected at substantially a second end to the first force opposing means, at substantially a second end to the second force opposing means and at least one further point to the display means on an opposite side to the display means to the side of the display means connected to the first piezo-electric actuator.

The apparatus may further comprise a support means, wherein the display means and the at least one force opposing means may be mounted in a floating configuration on the support means.

The display means may be connected to the support means by at least one of: at least one spring; at least one vertical metal arm; at least one foam body; at least one bearing; at least one trail; and at least one low friction sliding surface.

The actuator means may be at least one of: a piezo-actuator; a dynamic eccentric mass actuator; a moving coil actuator; and a moving magnet actuator.

The display means may be a touch sensitive display module, wherein the actuator means may be configured to apply the first and the second force in response to the display module determines a contact on the touch sensitive display module.

The apparatus may further comprise at least one force transfer means located between the actuator and the display module, wherein the actuator means may be configured to apply a first force in a first direction to the display means via the at least one force transfer means.

The force transfer means may comprise at least one spacer.

The apparatus may further comprise at least one further force opposing means connected to the actuator means, the actuator means may be configured to apply a third force in the second direction to the first force opposing means, wherein the apparatus experiences a rotational moment.

The force opposing means may comprise a counterweight

For better understanding of the present invention, reference will now be made by way of example to the accompanying drawings in which:

FIGS. 3a and 3b show an example topology for display apparatus according to some embodiments;

FIG. 4 shows another example topology for display apparatus according to some further embodiments.

The application describes apparatus and methods of construction for apparatus suitable for generating more interactive touch screen devices capable of creating a more interactive user experience than with a conventional touch screen display.

Figure 1:
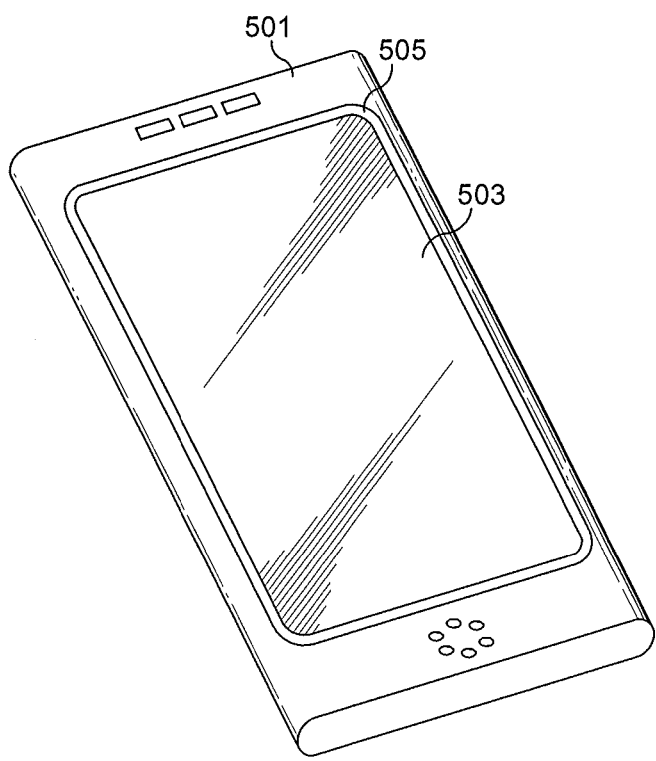
FIG. 1 shows a physical apparatus suitable for employing embodiments of the application.
Figure 2:
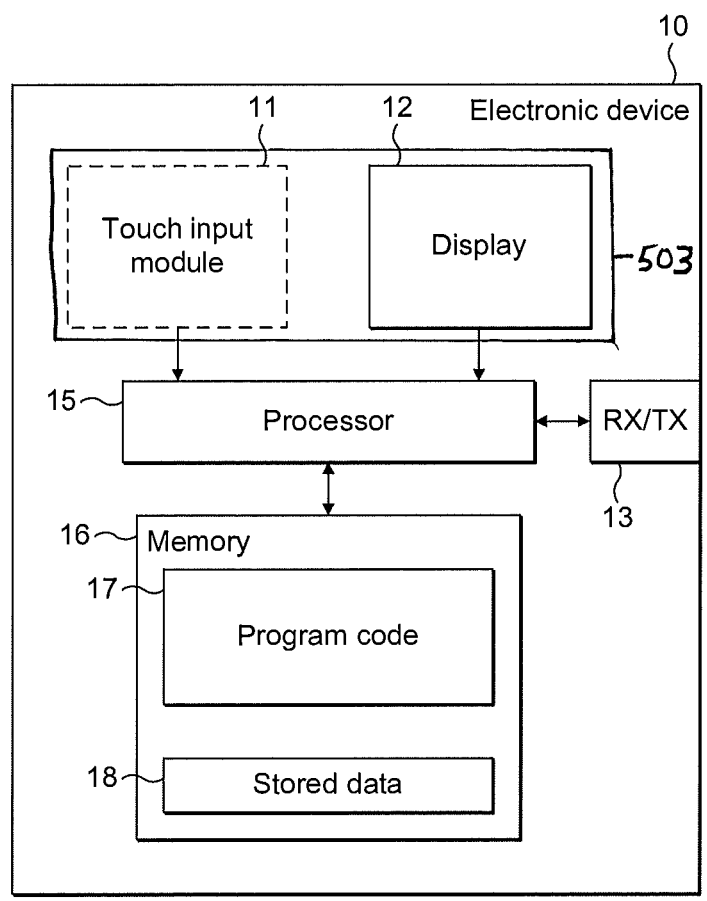
FIG. 2 shows schematically apparatus suitable for employing embodiments.

With respect to FIG. 1, an example of a physical schematic representation of a mobile device suitable for comprising embodiments of the application is shown. The mobile device comprises a case part 501 and a touch/display module 503. Due to manufacturing tolerances there may be a gap 505 located between the case 501 and the touch/display module 503. The gap 505 between the case 501 and display module 503 can in some embodiments be filled by the use of a silicone gasket. However in some embodiments of the application the gap may be closed by use of a flexible membrane FIG. 2 further shows a schematic block diagram of an exemplary electronic device 10 or apparatus on which embodiments of the application may be implemented. The electronic device 10 is configured to provide improved user interface or localized haptic feedback and interaction.

The electronic device 10 is in some embodiments as shown with respect to FIG. 1 a mobile terminal, mobile phone or user equipment for operation in a wireless communication system.

In some other embodiments, the electronic device is any suitable electronic device configured to provide a image display, such as for example a digital camera, a portable audio player (also known as mp3 players), and a portable video or media player (also known as mp4 players). In other embodiments the apparatus may be any suitable electronic device with a touch interface (which may or may not display information) such as a touch-screen or touch-pad configured to provide feedback when the touch-screen or touch-pad is touched. For example in some embodiments the touch-pad may be a touch-sensitive keypad which may in some embodiments have no markings on it and in other embodiments have physical markings or designations on the front window. An example of such a touch sensor may be a touch sensitive user interface to replace keypads in devices that do not require a screen mounted underneath the front window projecting a display. The user may in such embodiments be notified of where to touch by a physical identifier—such as a raised profile, or a printed layer which may be illuminated by a light guide.

The electronic device 10 comprises a touch/display piezo module 503 which comprises an input module or user interface 11, which is linked to a processor 15 and a display module 12 also connected to the processor 15. The processor 15 is in some embodiments further linked to a transceiver (TX/RX) 13. The processor 15 is furthermore in some embodiments further linked to a memory 16.

In some embodiments, the touch input module 11 and/or the display 12 are separate or separable from the electronic device and the processor receives signals from the touch input module 11 and/or transmits and signals to the display 12 via the transceiver 13 or another suitable interface. Furthermore in some embodiments the touch input module 11 and display 12 are parts of the same component.

The processor 15 in some embodiments can be configured to execute various program codes 17. The implemented program codes 17, in some embodiments the code may comprise such routines as touch capture digital processing or configuration code where the touch input module inputs are detected and processed, display image processing and image interaction code where the data to be passed to generate the display images is generated for example based on the detection of the input. The implemented program codes 17 may in some embodiments be stored for example in the memory 16 for retrieval by the processor 15 whenever needed. The memory 15 in some embodiments may further provide a section 18 for storing data, for example data that has been processed in accordance with the application, for example display information data.

The touch input module 11 may comprise any suitable touch screen interface technology. For example in some embodiments the touch screen interface may comprise a capacitive sensor configured to be sensitive to the presence of a finger above or on the touch screen interface. The capacitive sensor may comprise an insulator (for example glass or plastic), coated with a transparent conductor (for example indium tin oxide—ITO). As the human body is also a conductor, touching the surface of the screen results in a distortion of the local electrostatic field, measurable as a change in capacitance. Any suitable technology may be used to determine the location of the touch. The location can be passed to the processor which may calculate how the user's touch relates to the device. The insulator protects the conductive layer from dirt, dust or residue from the finger.

In some other embodiments the touch input module may be a resistive sensor comprising of several layers of which two are thin, metallic, electrically conductive layers separated by a narrow gap. When an object, such as a finger, presses down on a point on the panel's outer surface the two metallic layers become connected at that point: the panel then behaves as a pair of voltage dividers with connected outputs. This causes a change in the electrical current which is registered as a touch event and sent to the processor for processing.

In some other embodiments the touch input module may further determine a touch using technologies such as visual detection for example a camera either located below the surface or over the surface detecting the position of the finger or touching object, projected capacitance detection, infra-red detection, surface acoustic wave detection, dispersive signal technology, and acoustic pulse recognition.

The apparatus 10 can in some embodiments be capable of implementing the processing techniques at least partially in hardware, in other words the processing carried out by the processor 15 may be implemented at least partially in hardware without the need of software or firmware to operate the hardware.

The apparatus 10 in some embodiments can comprise a transceiver 13 configured to enable communication with other electronic devices, for example in some embodiments via a wireless communication network. For example the transceiver 13 of the apparatus can, in embodiments implemented within a mobile device such as shown in FIG. 1, be configured to transmit and receive via a suitable mobile communications network such as universal mobile telecommunications service (UMTS) protocol.

The display 12 in some embodiments comprises any suitable display means or technology. For example the display element may be located below the touch input module and project an image through the touch input module to be viewed by the user. The display 12 may comprise any suitable display technology such as liquid crystal display (LCD), light emitting diodes (LED), organic light emitting diodes (OLED), plasma display cells, Field emission display (FED), surface-conduction electron-emitter displays (SED), and Electophoretic displays (also known as electronic paper, e-paper or electronic ink displays). In some embodiments the display 12 comprises one of the display technologies projected using a light guide to the display window. As described above the display 12 in some embodiments may be implemented as a physical fixed display. For example the display may be a physical decal or transfer on the front window. In some other embodiments the display may be located on a physically different level from the rest of the surface, such a raised or recessed marking on the front window. In some other embodiments the display may be a printed layer illuminated by a light guide under the front window.

With respect to FIG. 3a, a schematic view of the touch/display piezo module 503 or apparatus is shown in further detail according to some embodiments of the application. The touch/display piezo module 503 in some embodiments comprises a chassis or support means 102. The chassis 102 is configured to support a touch/display module 101 or display means and at least one pair of counterweights 103 or force opposing means in a floating configuration. The chassis 102 can be formed from any suitable material for example any suitable metal and/or plastic.

The touch/display piezo module 503 further comprises a touch/display module 101 or display means which can implement any of the described above display part 12 and touch input module 11 implementations. The touch/display module 101 as described above is mounted in a floating configuration with respect to the chassis or support means. In other words the touch/display module 101 can move freely with respect to at least one degree of freedom of motion with respect to the chassis. For example with respect to the example shown in FIG. 3 the touch/display module 101 can move laterally or in a parallel plane with respect to the chassis 102. The touch/display module 101 can in some embodiments be connected to the chassis with springs, vertical metal arms, foams, bearings, trails or low friction sliding surfaces. The touch/display module 101 in some embodiments is connected to spacers 104 or any suitable force transfer means which are connected to or in contact with the two short sides of the touch/display module. In the following examples the terms long side and short side represent labels for pairs of sides of the display. Although in some embodiments these labels are associated with the long and short faces of a polygon shaped touch/display module 101 it would be appreciated that the faces may be substantially equal in size or in some embodiments the "short" side is the label for the face which is the longer of the two pairs.

The touch/display piezo module 503 in some embodiments further comprises spacers 104 or force transfer means which are configured to physically connect the touch/display module 101 to at least one piezoelectric transducer and furthermore to pass any force generated by the at least one piezoelectric transducer to the touch/display module along the physical connection of the spacers 104. The spacers 104 can be formed from any suitable material such as Poron (or any other suitable foamed plastics). In some embodiments the spacers 104 can be formed from any material which allows the piezos-electric transducers to bend and still hold and carry forces between piezo-electric transducers and the display/touch module 101.

In some embodiments as shown in FIG. 3a there can be two piezoelectric transducers. A first piezoelectric transducer 105 located substantially along and adjacent to a first short side of the touch/display module 101 and connected to the first long side of the touch/display module by two spacers 104 located about one third and two thirds along the first short side of the touch/display module 101.

A second piezoelectric transducer 106 is further located substantially along and adjacent a second short side of the touch/display module 101 and connected by a further two spacers 104 located about one third and two thirds along the second short side of the touch/display module 101.

The first piezoelectric transducer 105 is furthermore in some embodiments connected via a mechanical linkage to a first end of first counterweight 103a and via a mechanical linkage to a first end of a second counterweight 103b in such a way that any force exerted by the first piezoelectric transducer 105 via the spacers 104 to the touch/display module is configured to produce a force on the opposite direction on the first counterweight 103a and the second counterweight 103b via the mechanical linkages.

The second piezoelectric transducer 106 is furthermore in some embodiments connected via a mechanical linkage to a second end of the first counterweight 103a and via a mechanical linkage to a second end of a second counterweight 103b in such a way that any force exerted by the second piezoelectric transducer 106 via the spacers 104 to the touch/display module is configured to produce a force in the opposite direction on the first counterweight 103a and the second counterweight 103b via the mechanical linkages.

In some embodiments the touch/display module comprises a pair of counterweights the first counterweight 103a and the second counterweight 103b. In some embodiments the counterweights 103 can be wolfram bars, however any suitable force opposing means can be employed. In some embodiments the force opposing means use the actuator means to generate a force opposing the display means force such that a translational moment can be significantly reduced. The counterweights can in some embodiments be located adjacent the long sides of the touch/display module 101. The counterweights 103 are furthermore as described above connected at their ends to each other via of the first and second piezoelectric transducers. In some embodiments as described above the two counterweights are supported by the chassis 102 in a floating mounting allowing freedom of motion in directions parallel to the display touch/display module 101.

The first piezoelectric transducer 105 and the second piezoelectric transducer 106 are shown as long components capable of producing forces along their length. It would be understood that in some embodiments similar results could be achieved by point or local effect forces and appropriate mechanical force transmission, for example by levers and pivots. Furthermore although in the following description the use of piezoelectric transducers are described any suitable actuator means or transducer means could be employed, for example a dynamic eccentric mass actuator; a moving coil actuator; and a moving magnet actuator.

Thus for example in some embodiments driving the first piezoelectric transducer 105 to "push" the display 101 (downwards with respect to FIG. 3a) towards the second piezoelectric transducer 106 which is further configured to "pull" the display/touch module 101 (also "downwards") in the direction shown by arrow 115 has an effect on the counterweights 103a, 103b which are moved in the opposite direction to the display as shown in FIG. 3 by the directions shown by arrows 111 and 113. This moment 111 and 113 is thus configured to counter the moment of motion from the display/touch module 101 shown by the moment 115.

It has been found that for example with a display of approximately 4 inches having a mass of approximately 20 to 25 grams then two counterweights with mass of approximately 4.4 grams each can counter or substantially counter the display moment. For example in some embodiments a 0.7 mm by 1.8 mm by 90 mm wolfram bar can be implemented as a counterweight. Furthermore in some embodiments the counterweight or force opposing means can be modified in order to tune the effective mechanical imperfections in the display or any effects of interconnects between the touch/display module 101 and the chassis 102.

The implementation of counter balancing using counterweights in such apparatus produces less stress on the battery when compared against more active damping compensation implementations, and possibly enables the use of local haptic implementations, and could also be used to replace traditional vibra. For example the vibration does not "kill" totally even hard touch surfaces. The counterweights (CW) and touch/display module in some embodiments can vibrate when the piezo-electrical transducers or actuators are driven. The amount of displacement (movement) is furthermore related to the masses of the display module and CWs. When the user touches the touch/display module they connect with the touch/display module and increase the effective mass of the touch/display module which in turn decreases the displacement. If the user applies sufficient force to the touch/display module the touch/display module will not move at all. In this situation the CW can vibrate even more. In such embodiments the transition from localized haptics to normal non-localized haptics is smooth although highly related to the implementation of the display suspension.

With respect to FIG. 3b a further example is shown. The example shown in FIG. 3b is similar to that shown in FIG. 3a but whereas the driving electric field on both the first and second piezo-electric transducer is such that both the first and the second counterweights have an applied force in the same direction, the first counterweight 103a has a first applied force in a first direction 110 and the second counterweight 103b has a second applied force 115 in a second direction 115 which is substantially opposite to the first applied force first direction 110. These forces effectively cancel out any translational moment of the touch/display module 101 but create a rotational moment which can in some embodiments be used as a vibra.

With respect to FIG. 4, some further embodiments of the application are described. The touch/display module 503 shown in FIG. 4 is similar to that shown in FIGS. 3a and 3b however the second piezoelectric transducer 106 is replaced by a leaf spring 107. The leaf spring 107 in some embodiments can be configured to be formed from any resilient member, material or structure capable of exerting a force when displaced from its "natural" resting position. The embodiments shown in FIG. 4 therefore have similar performance, the leaf spring 107 being configured to produce that the structure is simpler in only requiring a single piezoelectric transducer 105.

Figure 5:
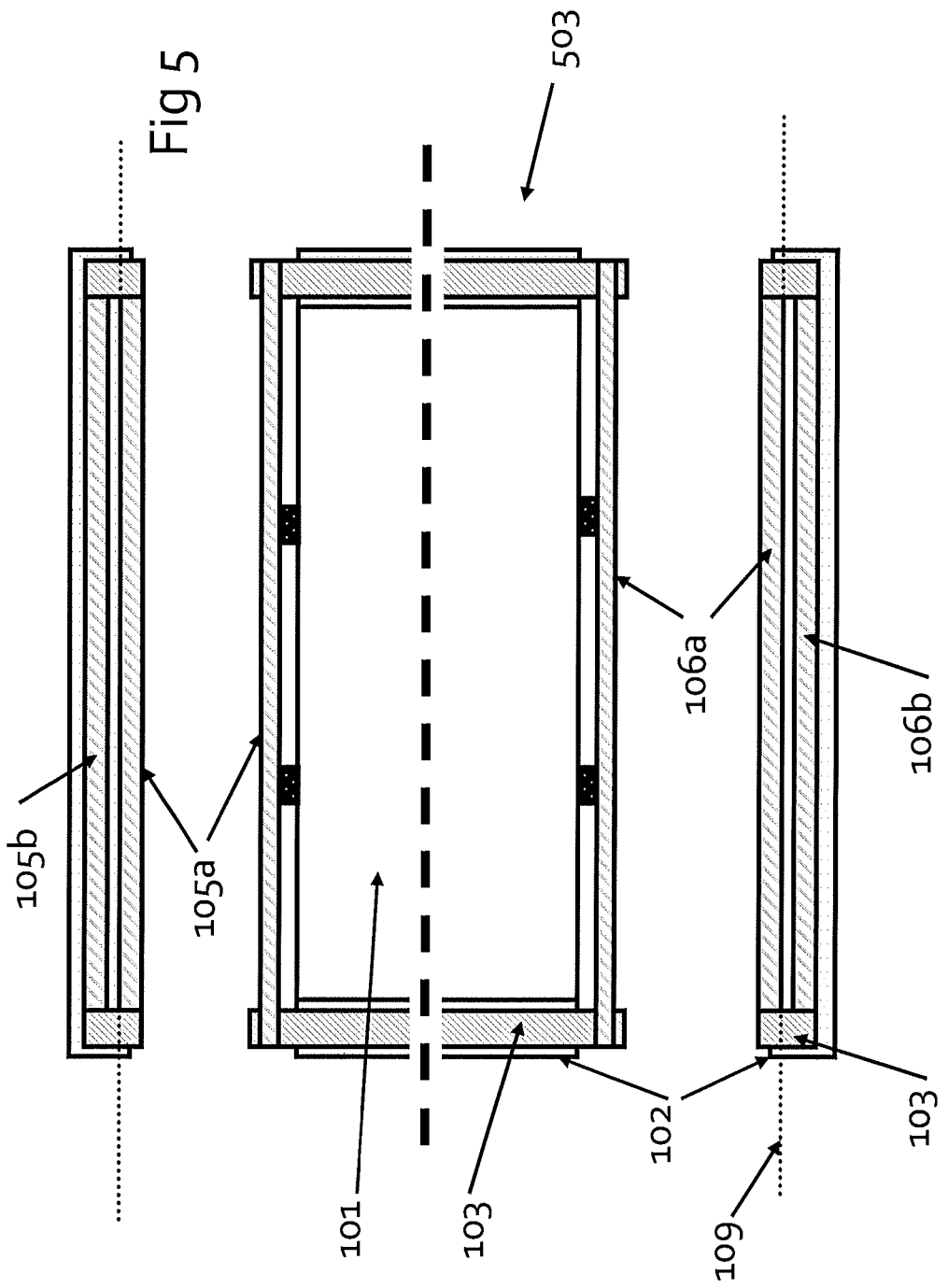
FIG. 5 shows a further example topology for display apparatus according to some embodiments.

With respect to FIG. 5 a three dimensional counterbalance configuration is shown. In such embodiments the display/touch module 503 differs from the space/touch module shown in FIGS. 3a and 3b in that rather than having a single piezoelectric transducer per side, these configurations implement at least two piezoelectric transducers on either side. In such configurations at least one pair of transducers on each side are arranged either side of a vertical midline 109 of the display 101 and can be configured to provide a vertical "push" and "pull" moment in parallel with or separate from the horizontal "push" and "pull" moment produced by pairs of transducer either side of the display module. In such embodiments more sophisticated haptic feedback without case vibrations can be implemented.

Therefore in summary the application in some embodiments is an apparatus comprising: a display module; an actuator connected to the display, the actuator being configured to apply a first force in a first direction to the display module; and at least one counterweight connected to the actuator, the actuator being configured to apply a second force in a second direction to the counterweight, wherein the apparatus experiences substantially no translational moment.

Also in summary the application in some other embodiments can be a method of operating an apparatus comprising: applying by an actuator a first force in a first direction to a display module; and applying by the actuator a second force in a second direction to at least one counterweight, wherein the apparatus experiences substantially no translational moment.

It shall be appreciated that the term user equipment is intended to cover any suitable type of wireless user equipment, such as mobile telephones, portable data processing devices or portable web browsers.

In general, the design of various embodiments of the invention may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The design of embodiments of this invention may be implemented by computer software executable by a data processor of the mobile device, such as in the processor entity, or by hardware, or by a combination of software and hardware. Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD.

The memory used in the design of embodiments of the application may be of any type suitable to the local technical environment and may be implemented using any suitable data storage technology, such as semiconductor-based memory devices, magnetic memory devices and systems, optical memory devices and systems, fixed memory and removable memory. The data processors may be of any type suitable to the local technical environment, and may include one or more of general purpose computers, special purpose computers, microprocessors, digital signal processors (DSPs), application specific integrated circuits (ASIC), gate level circuits and processors based on multi-core processor architecture, as non-limiting examples.

Embodiments of the inventions may be designed by various components such as integrated circuit modules.

As used in this application, the term 'circuitry' refers to all of the following:
(a) hardware-only circuit implementations (such as implementations in only analog and/or digital circuitry) and
(b) to combinations of circuits and software (and/or firmware), such as: (i) to a combination of processor(s) or (ii) to portions of processor(s)/software (including digital signal processor(s)), software, and memory(ies) that work together to cause an apparatus, such as a mobile phone or server, to perform various functions and
(c) to circuits, such as a microprocessor(s) or a portion of a microprocessor(s), that require software or firmware for operation, even if the software or firmware is not physically present.

This definition of 'circuitry' applies to all uses of this term in this application, including any claims. As a further example, as used in this application, the term 'circuitry' would also cover an implementation of merely a processor (or multiple processors) or portion of a processor and its (or their) accompanying software and/or firmware. The term 'circuitry' would also cover, for example and if applicable to the particular claim element, a baseband integrated circuit or applications processor integrated circuit for a mobile phone or similar integrated circuit in server, a cellular network device, or other network device.

The foregoing description has provided by way of exemplary and non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention as defined in the appended claims.

The invention claimed is:

1. An apparatus comprising:
 a display module;
 an actuator connected to the display, the actuator being configured to apply a first force in a first direction to the display module; and
 at least one counterweight connected to the actuator, the actuator being configured to apply a second force in a second direction to the counterweight, wherein the apparatus experiences substantially no translational moment;
 wherein the actuator comprises a first piezo-electric actuator connected at substantially a first end to a first counterweight, substantially at a second end to a second counterweight, and at least one further point to the display module; and
 wherein the actuator comprises a second piezo-electric actuator connected at substantially a first end to the first counterweight, at substantially a second end to the second counterweight and at least one further point to the display module on an opposite side to the display module to the side of the display module connected to the first piezo-electric actuator.

2. The apparatus as claimed in claim 1, further comprising a resilient member connected at substantially the first end to the first counterweight, at substantially the second end to the second counterweight and at least one further point to the display module on an opposite side to the display module to the side of the display module connected to the first piezo-electric actuator.

3. The apparatus as claimed in claim 1, further comprising a chassis member, wherein the display module and the at least one counterweight are mounted in a floating configuration substantially over the chassis member.

4. The apparatus as claimed in claim 3, wherein the display module is connected to the chassis by at least one of:
 at least one spring;
 at least one vertical metal arm;
 at least one foam body;
 at least one bearing;
 at least one trail; and
 at least one low friction sliding surface.

5. The apparatus as claimed in claim 1, wherein the actuator is at least one of:
 a piezo-actuator;
 a dynamic eccentric mass actuator;
 a moving coil actuator; and
 a moving magnet actuator.

6. The apparatus as claimed in claim 1, wherein the display module is a touch sensitive display module, wherein the actuator is configured to apply the first and the second force in response to the display module determines a contact on the touch sensitive display module.

7. The apparatus as claimed in claim 1, further comprising at least one spacer located between the actuator and the display module, wherein the actuator is configured to apply a first force in a first direction to the display module via the at least one spacer.

8. The apparatus as claimed in claim 1, further comprising at least one further counterweight connected to the actuator, the actuator being configured to apply a third force in the second direction to the first counterweight, wherein the apparatus experiences a rotational moment.

9. A method for operating an apparatus comprising:
 applying by an actuator a first force in a first direction to a display module; and
 applying by the actuator a second force in a second direction to at least one counterweight, wherein the apparatus experiences substantially no translational moment;
 wherein applying a second force in a second direction to at least one counterweight comprises connecting the actuator at substantially a first end to a first counterweight, substantially at a second end to a second counterweight, and at least one further point to the display module; and
 wherein applying a second force in a second direction to at least one counterweight further comprises connecting a further actuator at substantially a first end to the first counterweight, at substantially a second end to the second counterweight and at least one further point to the display module on an opposite side to the display module to the side of the display module connected to the actuator.

10. The method as claimed in claim 9, wherein applying a second force in a second direction to at least one counterweight further comprises connecting a resilient member at substantially the first end to the first counterweight, at substantially the second end to the second counterweight and at least one further point to the display module on an opposite side to the display module to the side of the display module connected to the actuator.

11. The method as claimed in claim 9, further comprising mounting the display module and the at least one counterweight in a floating configuration over a chassis member.

12. The method as claimed in claim 11, further comprising connecting the display module to the chassis by at least one of:
 at least one spring;
 at least one vertical metal arm;
 at least one foam body;
 at least one bearing;
 at least one trail; and
 at least one low friction sliding surface.

13. The method as claimed in claim 9, wherein the actuator is at least one of:
 a piezo-actuator;
 a dynamic eccentric mass actuator;
 a moving coil actuator; and
 a moving magnet actuator.

14. The method as claimed in claim 9, wherein the display module is a touch sensitive display module, further comprising determining a contact on the touch sensitive display module; and wherein the actuator is configured to apply the first and the second force in response the contact on the display module.

15. The method as claimed in claim 9, further comprising connecting the actuator and the display module by at least one spacer, wherein the actuator is configured to apply a first force in a first direction to the display module via the at least one spacer.

16. The method as claimed in claim 9, further comprising connecting at least one further counterweight to the actuator, applying a third force in the second direction to the first counterweight, such that the apparatus experiences a rotational moment.

* * * * *